United States Patent
Huang

(10) Patent No.: US 10,582,210 B2
(45) Date of Patent: Mar. 3, 2020

(54) METHOD OF MOTION VECTOR DERIVATION FOR VIDEO CODING

(71) Applicant: Han Huang, Beijing (CN)

(72) Inventor: Han Huang, Beijing (CN)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 511 days.

(21) Appl. No.: 15/324,280

(22) PCT Filed: Jul. 15, 2015

(86) PCT No.: PCT/CN2015/084042
§ 371 (c)(1),
(2) Date: Jan. 6, 2017

(87) PCT Pub. No.: WO2016/008408
PCT Pub. Date: Jan. 21, 2016

(65) Prior Publication Data
US 2017/0214932 A1    Jul. 27, 2017

(30) Foreign Application Priority Data
Jul. 18, 2014   (WO) ............... PCT/CN2014/082523

(51) Int. Cl.
*H04N 19/513*   (2014.01)
*H04N 19/537*   (2014.01)
(Continued)

(52) U.S. Cl.
CPC ........... *H04N 19/513* (2014.11); *H04N 19/52* (2014.11); *H04N 19/527* (2014.11);
(Continued)

(58) Field of Classification Search
CPC .................................................... H04N 19/513
(Continued)

(56) References Cited

U.S. PATENT DOCUMENTS

| 5,278,663 A | 1/1994 | Hong |
| 8,345,763 B2 | 1/2013 | Chen et al. |

(Continued)

FOREIGN PATENT DOCUMENTS

| CN | 101277449 A | 10/2008 |
| CN | 101415122 A | 4/2009 |

(Continued)

OTHER PUBLICATIONS

Huang et al. "Control-Point Representation and Differential Coding Affine-Motion Compensation", IEEE Transitions on Circuits and Systems for Video Technology, Oct. 1, 2013, pp. 1651-1660. (Year: 2013).*

(Continued)

*Primary Examiner* — James M Anderson, II
(74) *Attorney, Agent, or Firm* — McClure, Qualey & Rodack, LLP

(57) ABSTRACT

A method and apparatus for deriving a sub-block motion vector for the current sub-block based on a motion-model function depending on the current sub-block location are disclosed. The derived sub-block motion vector is then used for encoding or decoding the sub-block. The motion-model function may correspond to an affine motion-model function or a bilinear motion-model function. In one embodiment, a new Merge mode can be used to apply prediction of a current block by applying prediction on the sub-block basis using the sub-block motion vector derived from the motion-model function. In another embodiment, an additional inter prediction mode can be used to apply prediction of a current block by applying prediction on the sub-block basis using the sub-block motion vector derived from the motion-model function.

17 Claims, 2 Drawing Sheets

$MV\_cur = a*x - b*y + e,$

(51) Int. Cl.
*H04N 19/527* (2014.01)
*H04N 19/52* (2014.01)
*H04N 19/70* (2014.01)
H04N 19/96 (2014.01)
H04N 19/46 (2014.01)

(52) U.S. Cl.
CPC ........... *H04N 19/537* (2014.11); *H04N 19/70* (2014.11); *H04N 19/46* (2014.11); *H04N 19/96* (2014.11)

(58) Field of Classification Search
USPC .................................................... 375/240.16
See application file for complete search history.

(56) References Cited

U.S. PATENT DOCUMENTS

| | | |
|---|---|---|
| 9,055,300 B2 | 6/2015 | Lee et al. |
| 9,912,949 B2 | 3/2018 | Oh et al. |
| 2008/0240247 A1 | 10/2008 | Lee et al. |
| 2012/0134416 A1 | 5/2012 | Lin et al. |
| 2014/0241434 A1 | 8/2014 | Lin et al. |

FOREIGN PATENT DOCUMENTS

| | | | |
|---|---|---|---|
| CN | 101448154 | 6/2009 | |
| CN | 101466036 | 6/2009 | |
| CN | 102273206 A | 12/2011 | |
| CN | 102340660 | 2/2012 | |
| CN | 102598670 A | 7/2012 | |
| CN | 103096071 A | 5/2013 | |
| CN | 103907346 A | 7/2014 | |
| EP | 1 158 806 A1 | 11/2001 | |
| EP | 1158806 A1 * | 11/2001 | ........... H04N 19/537 |
| WO | WO 2013/068547 | 5/2013 | |

OTHER PUBLICATIONS

Huang, H., et al.; "Control-Point Representation and Differential Coding Affine-Motion Compensation;" IEEE Transactions on Circuits and System for Video Technology; vol. 23; No. 10; Oct. 2013; pp. 1651-1660.

He, Y., et al.; "Efficient coding with adaptive motion models;" Apr. 2003; pp. 1-5.

International Search Report dated Oct. 14, 2016, issued in application No. PCT/CN2015/084042.

* cited by examiner

METHOD OF MOTION VECTOR DERIVATION FOR VIDEO CODING

CROSS REFERENCE TO RELATED APPLICATIONS

The present invention is a National Stage Application of PCT Patent Application, Ser. No. PCT/CN2015/084042, filed on Jul. 15, 2015, which claims priority to PCT Patent Application, Ser. No. PCT/CN2014/082523, filed on Jul. 18, 2014. The PCT Patent Applications are hereby incorporated by reference in their entireties.

TECHNICAL FIELD

The present invention relates to video coding. In particular, the present invention relates to motion vector derivation for a sub-block based on a motion-model function for video coding.

BACKGROUND

Motion estimation is an effective inter-frame coding technique to exploit temporal redundancy in video sequences. Motion-compensated inter-frame coding has been widely used in various international video coding standards. The motion estimation adopted in various coding standards is often a block-based technique, where motion information such as coding mode and motion vector is determined for each macroblock or similar block configuration. In addition, intra coding is also adaptively applied, where the picture is processed without reference to any other picture. The inter-predicted or intra-predicted residues are usually further processed by transformation, quantization, and entropy coding to generate compressed video bitstream.

Block matching is an efficient means to determine displacement between two temporal pictures, where the content movement between two temporal pictures is determined on a block by block basis. For example, block-based motion estimation has been used in coding standards such as Advanced Video Coding (AVC)/H.264 and the new High Efficiency Video Coding (HEVC). For example, in HEVC, the motion prediction is performed based on a prediction unit (PU). The displacement between the two corresponding blocks in two temporal pictures is defined as motion vector (MV). In 3D video coding, if the reference picture is a coded picture from a different view, the displacement is called disparity vector (DV). Without loss of generality, the displacement can be referred to as a MV in this disclosure.

The assumption of block-based motion compensation is that all the pixels within a block undergo the same displacement and have the same MV. However, in a typical video sequence, such translational movement can hardly accurately describe the complex real movement in the contents. Therefore, the block-based motion estimation can't capture complex motion, such as rotation, zooming, and the deformation of moving objects. It is very desirable to develop motion estimation that is capable of deriving motion information for video units smaller than a whole block.

SUMMARY

A method and apparatus for deriving a sub-block motion vector for the current sub-block within a current block based on a motion-model function depending on the current sub-block location are disclosed. The derived sub-block motion vector is then used for encoding or decoding the sub-block.

The motion-model function may correspond to an affine motion-model function or a bilinear motion-model function. When the motion-model function corresponds to the affine motion-model function represented by $F(x,y)=a\times x + b\times y + e$, and wherein $(x,y)$ is the current sub-block location and a, b and e are affine model parameters associated with the affine motion-model function. When the current block size is M×N, three affine parameter motion vectors, MV_0, MV_1 and MV_2 are determined for locations (0, 0), (M, 0) and (0, N) respectively. In this case, the affine model parameters are determined according to e=MV_0, a=(MV_1−MV_0)/M and b=(MV_2−MV_0)/N, and wherein M and N are positive integers.

The three affine parameter motion vectors can be derived based on neighboring coded blocks of the current block. In this case, an affine Merge mode using the three affine parameter motion vectors may be enabled, and the three affine parameter motion vectors are inserted into a Merge candidate list for encoding or decoding of the current block. In the affine Merge mode, a sub-block motion vector is derived for each sub-block of the current block based on the affine motion-model function and the three affine parameter motion vectors. Furthermore, each sub-block is predicted using the sub-block motion vector if the affine Merge mode is used for the current block. A high-level syntax element can be signaled in sequence parameter set (SPS), video parameter set (VPS), picture parameter set (PPS) or slice header to indicate whether the affine Merge mode is enabled. The current block may correspond to a prediction unit (PU) and the affine Merge mode can be enabled only when the PU belongs to a selected PU partition type set, wherein the selected PU partition type set consists of one or more PU partition types selected from {2N×2N, 2N×N, N×2N, 2N×nU, 2N×nD, nL×2N, nR×2N}. A syntax element can be signaled for the current block to indicate whether the affine Merge mode is used for the current block. A second syntax element for positions of the three affine parameter motion vectors in the Merge candidate list can be signaled. The syntax element can also be derived implicitly at a decoder side. For example, the syntax element can be implicitly derived according to coding mode selections, motion parameters of neighboring blocks of the current block, or motion parameters of reference blocks of the current bock.

In another embodiment, one or more of the three motion vectors, MV_0, MV_1 and MV_2 can be determined by refining respective one or more MV predictors to form one or more refined motion vectors using one or more transmitted motion vector differences (MVDs). If an additional inter prediction mode is enabled, a sub-block motion vector can be derived for each sub-block of the current block based on the motion-model function and the three motion vectors after one or more of the three motion vectors being refined. Each sub-block is then predicted using a sub-block motion vector if the additional inter prediction mode is used for the current block. A syntax element can be signaled for the current block to indicate whether the additional inter prediction mode is used for the current block. The syntax element can be signaled after a second syntax element for a Merge flag for the current block in a bitstream, where the Merge flag indicates whether the current block is coded using a Merge mode. The syntax element may also be derived implicitly at a decoder side.

When a sub-block motion vector is derived using the motion-model function, the derived sub-block motion vector can be quantized to ¼, ⅛, 1/12, 1/16 or 1/32 pixel accuracy. When the current block corresponds to a prediction unit (PU), the sub-block size may be 4×4, 8×8 or 16×16.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

In order to provide improved motion description for a block, embodiments according to the present invention divides a current block (e.g. a prediction unit (PU) in HEVC) into sub-blocks (e.g. sub-PUs). A motion vector (also referred to as "derived sub-block motion vector (MV)") is derived for each sub-block according to a motion model. For example, each PU can be divided into multiple sub-PUs and the MV for each sub-PU is derived according to a motion-model function F(x,y), where (x,y) is the location of the sub-PU and F is a function representing the motion model.

Figure 1:
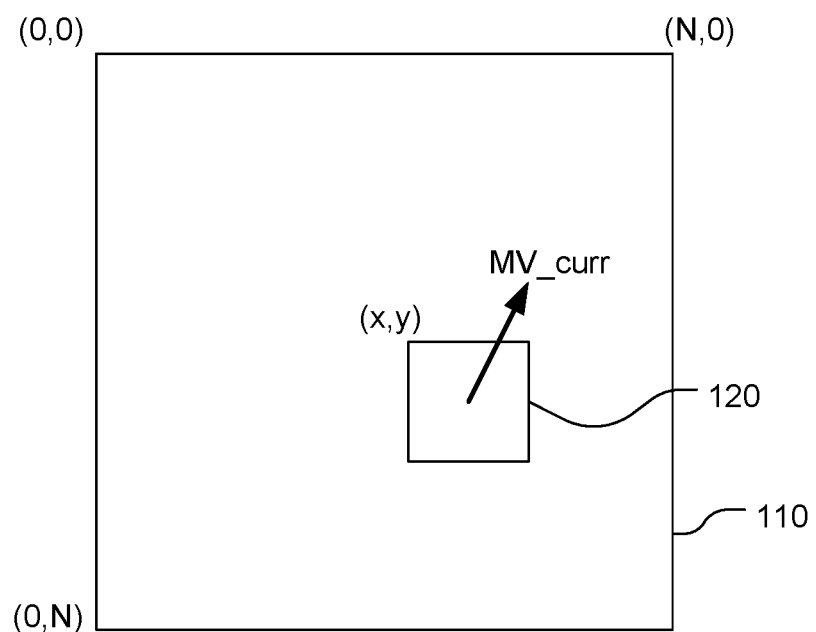
FIG. 1 illustrates an example of sub-block motion vector derivation for a sub-block based on a motion-model function according to an embodiment of the present invention, where the block size is N×N.

In one embodiment, the derived sub-block motion vector, MV_cur for a sub-PU is derived by an affine motion model:

$$MV\_cur = a*x + b*y + e, \quad (1)$$

where (x,y) is the location of the sub-PU and the three parameters a, b and e are the affine model parameters. Since MV_curr corresponds to the derived sub-block motion vector, and x and y are scalar representing the horizontal and vertical positions of a sub-PU, a, b and e are vectors having the same dimensions as the motion vector (i.e., two-dimensional). FIG. 1 illustrates an example of affine motion model for a sub-PU (120) in a PU (110) according to an embodiment of the present invention. The size for the PU (110) is N×N and the current sub-PU (120) is located at (x,y) in this example. However, the PU in the other embodiment may also be rectangular such as M×N and M and N are positive integers. The location of the sub-PU (120) may correspond to the upper-left corner coordinate of the sub-PU (120). However, other locations (e.g. the center point) of the sub-PU (120) may also be used as the sub-PU location.

In the affine motion model as mentioned above, the three vectors a, b and e have to be determined in order to derive the motion information for granular image units (i.e., sub-PU (120)). In one embodiment, the affine parameters are represented by three MVs (also named as three affine parameter motion vectors) designated as MV_0, MV_1 and MV_2 at locations (0, 0), (N, 0) and (0, N) respectively and N is a positive integer. Then the derived sub-block motion vector, MV_cur is derived according to:

$$MV\_cur = MV\_0 + x*(MV\_1 - MV\_0)/N + y*(MV\_2 - MV\_0)/N. \quad (2)$$

In other words, the three affine model parameters corresponding to the above equation are:

$$a = (MV\_1 - MV\_0)/N,$$

$$b = (MV\_2 - MV\_0)/N, \text{ and}$$

$$e = MV\_0.$$

While the above example demonstrates the derivation of the three affine model parameters for an N×N PU, the derivation of the three affine model parameters for other PU sizes can be done similarly. For example, if the PU size is M×N, the vector parameter for a can be derived as $a = (MV\_1 - MV\_0)/M$ and the affine model parameters for b and e stay the same as above.

The three affine parameter motion vectors, MV_0, MV_1 and MV_2 can be derived based on neighboring coded blocks. Please noted that the number and the location of the affine parameter motion vectors in the foregoing embodiment are only for illustration, the present application is not limited thereto.

In another embodiment, the motion vector of a sub-PU (i.e., MV_cur) is derived by bilinear motion model. The bilinear model needs four parameters, a, b, c and d. For example, the X component (i.e., MV_x) of the motion vector for a sub-block at location (x,y) of the current block can be derived according to a bilinear motion model as, $a*(N-x)*(N-y) + b*x*(N-y) + c*y*(N-x) + d*x*y$, where the block size is N×N. Similarly, for the Y component (i.e., MV_y) of the motion vector for the sub-block at location (x,y) can be derived using four parameters. The parameters of the bilinear motion model can be derived from neighboring coded blocks.

As mentioned earlier, the derived motion information for sub-PU can be used for motion estimation/compensation to derive prediction residues for coding or decoding. The motion vector derivation for more granular image units (e.g., sub-PU) using a motion-model function can be applied to a new Merge mode (also referred to as "affine Merge mode"). In a conventional Merge mode, a current block shares the motion information from a neighboring block. A motion vector predictor of the current block is selected from a Merge candidate list, which includes a set of candidates from neighboring blocks in the spatial, temporal or view direction. For the new Merge mode, the three affine parameter motion vectors may be derived based on neighboring blocks. The three affine parameter motion vectors can be added into the Merge candidate list as an additional Merge candidate. The new Merge mode can be applied for symmetric PU partition type such as 2N×2N, 2N×N, N×2N or any other PU partitions (e.g. 2N×nU, 2N×nD, nL×2N, and nR×2N partitions referred as asymmetric motion partition (AMP) in HEVC). Alternatively, the new Merge mode can be applied only for PU partition type 2N×2N. In another embodiment, the new Merge mode is applied only for PU partition types 2N×2N, 2N×N and N×2N. In yet another embodiment, the new Merge candidate is applied only for a set of particular PU partition types. When the new Merge mode is selected for a block (e.g. a PU), motion vectors for sub-PUs of the PU are derived according to a motion-model function as disclosed above. Each sub-PU is then predicted according to a corresponding sub-block motion vector.

In one embodiment, a syntax element to indicate whether the new Merge mode is allowed (i.e., enabled) for associated video data can be signaled in a sequence level such as sequence parameter set (SPS), a video level such as video parameter set (VPS), a picture level such as picture parameter set (PPS) or adaptive parameter set (APS), or slice level such as the slice header. When the new Merge mode is enabled, the position of the three affine parameter motion vectors can be fixed at 0, 1, and 2 (i.e., the leading three positions in the Merge list) in the Merge candidate list. The position 0 refers to a leading (i.e., the first) position in the candidate list. The positions of the affine parameter motion vectors can also be signaled using a syntax element in a sequence level such as sequence parameter set (SPS), a video level such as video parameter set (VPS), a picture level such as picture parameter set (PPS) or adaptive parameter set (APS), or slice level such as the slice header.

The position of the affine parameter motion vectors can also be implicitly derived at a decoder side. For example, the position of the affine parameter motion vectors can be implicitly derived according to coding mode selections, motion parameters of the neighboring PUs of the current bock, or the motion parameters of the reference blocks of the current bock.

As mentioned earlier, the motion vectors used as the affine parameter motion vectors can be calculated for respective locations and may also be derived based on the motion information of neighboring blocks of the current block. In another embodiment, the motion vectors used as the affine parameter motion vectors can be refined based on transmitted motion vector difference (MVD), where the MVD corresponds to the difference between a motion vector and a motion vector predictor. Furthermore, one or more of the motion vectors used as the affine parameter motion parameter can be refined according to MVD.

The affine parameter motion vectors can be used in an additional inter prediction mode, wherein at least one of the affine parameter motion vector has been refined according to MVD. In other words, if the additional inter prediction mode is used for the current block (e.g. a PU), each sub-PU in the current block can be predicted using the corresponding sub-block motion vector, where the corresponding sub-block motion vector is derived based on one or more refined affine parameter motion vectors.

In a coding system allowing the refined affine parameter motion vectors to be used as another inter prediction mode, a flag can be signaled to indicate whether the additional inter prediction mode is enabled. This flag can be signaled after the Merge flag for the current block in a bitstream, wherein the Merge flag indicates whether the current block is coded using a Merge mode. For example, the syntax element is signaled in sequence parameter set (SPS), video parameter set (VPS), picture parameter set (PPS), adaptive parameter set (APS) or slice header to indicate whether the additional inter prediction mode is enabled. The syntax element can also be implicitly derived at a decoder side. For example, the syntax element can be implicitly derived according to coding mode selections, motion parameters of neighboring blocks of the current block, or motion parameters of reference blocks of the current bock.

As shown in equation (1), the sub-block motion vector derived may be a fractional number. According to one embodiment, the derived sub-block motion vector is quantized to ¼, ⅛, 1/12, 1/16 or 1/32 pixel accuracy. In one embodiment, consecutive sub-blocks with the same sub-block motion vector are merged into a larger sub-block for motion compensation.

The blocks referred in the above description may correspond to prediction units (PUs) as used in the High Efficiency Video Coding (HEVC) standard. In this case, the sub-block (i.e., sub-PU) size may correspond to 4×4, 8×8 or 16×16.

In the present application, the motion information for video units (e.g., sub-PU) more granular than a whole block should result in more accurate motion description for the block than the conventional motion estimation for the whole block.

Figure 2:
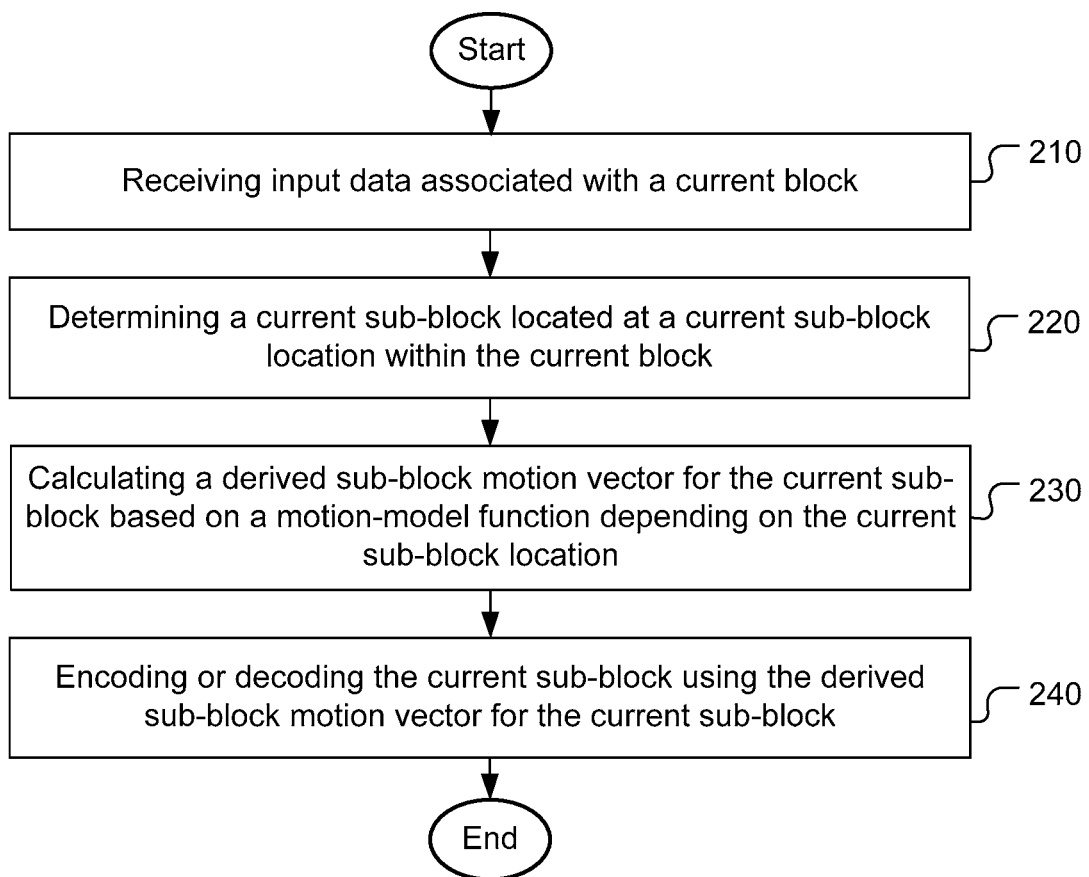
FIG. 2 illustrates an exemplary flowchart for a video coding system incorporating sub-block motion vector derivation based on a motion-model function according to an embodiment of the present invention.

FIG. 2 illustrates an exemplary flowchart for a video coding system incorporating sub-block motion vector derivation using a motion-model function according to an embodiment of the present invention. The input data associated with a current block is received as shown in step 210. The input data associated with the current block may be accessed from a media such as a RAM or DRAM in a system. Also the input data associated with the current block may be received directly from a processor (such as a central processing unit, a controller or a digital signal processor). At an encoder side, the input data corresponds to the pixel data to be coded. At the decoder side, the input data corresponds to coded data to be decoded. A current sub-block located at a current sub-block location within the current block is determined in step 220. A derived sub-block motion vector for the current sub-block is calculated based on a motion-model function depending on the current sub-block location in step 230. The current sub-block is then encoded or decoded using the derived sub-block motion vector for the current sub-block in step 240.

The exemplary flowchart shown in FIG. 2 is for illustration purpose. A skilled person in the art may re-arrange, combine steps or split a step to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of motion information derivation for blocks of a picture, the method comprising:
   receiving input data associated with a current block;
   determining a current sub-block located at a current sub-block location within the current block;
   deriving a Merge candidate list based on spatial and temporal neighboring blocks of the current block;
   deriving a plurality of affine parameter motion vectors;
   adding the plurality of affine parameter motion vectors into a predetermined position of the Merge candidate list;
   calculating a derived sub-block motion vector for the current sub-block based on an affine motion-model function depending on the current sub-block location, wherein the motion-model function is represented by $F(x,y)=a \times x + b \times y + e$, and wherein $(x,y)$ is the current sub-block location and a, b and e are affine model parameters associated with the affine motion-model function and are determined based on the plurality of affine parameter motion vectors; and
   encoding or decoding the current sub-block using the derived sub-block motion vector for the current sub-block.

2. The method claim 1, wherein the current block has a block size of M×N, and the plurality of affine parameter motion vectors are three affine parameter motion vectors, MV_0, MV_1 and MV_2 determined for locations (0, 0), (M, 0) and (0, N) respectively, and the affine model parameters are determined according to $e=MV\_0$, $a=(MV\_1-MV\_0)/M$ and $b=(MV\_2-MV\_0)/N$, and wherein M and N are positive integers.

3. The method claim 2, wherein the three affine parameter motion vectors are derived based on neighboring coded blocks of the current block.

4. The method claim 3, wherein one sub-block motion vector is derived for each sub-block of the current block based on the affine motion-model function and the three affine parameter motion vectors, and wherein each sub-block is predicted using said one sub-block motion vector if the affine Merge mode is used for the current block.

5. The method claim 4, wherein one or more syntax elements are used to indicate whether the affine Merge mode is enabled.

6. The method claim 5, wherein the affine Merge mode is enabled only for the blocks of the picture belonging to a selected PU partition type set, wherein the selected PU partition type set consists of one or more PU partition types selected from {2N×2N, 2N×N, N×2N, 2N×nU, 2N×nD, nL×2N, nR×2N}.

7. The method claim 5, wherein said one or more syntax elements are derived implicitly at a decoder side.

8. The method claim 7, wherein said one or more syntax elements are implicitly derived according to coding mode selections, motion parameters of neighboring blocks of the current block, or motion parameters of reference blocks of the current bock.

9. The method claim 2, wherein one or more of the three affine parameter motion vectors, MV_0, MV_1 and MV_2 are determined by refining respective one or more MV predictors to form one or more refined motion vectors using one or more transmitted motion vector differences (MVDs).

10. The method claim 9, wherein if an additional Inter prediction mode is enabled, one sub-block motion vector is derived for each sub-block of the current block based on the motion-model function and the three affine parameter motion vectors after said one or more of the three affine parameter motion vectors being refined, and each sub-block is predicted using said one sub-block motion vector if the additional Inter prediction mode is used for the current block.

11. The method claim 10, wherein a syntax element is used to indicate whether the additional Inter prediction mode is enabled.

12. The method claim 11, wherein the syntax element is signaled after a second syntax element for a Merge flag for the current block in a bitstream, and wherein the Merge flag indicates whether the current block is coded using a Merge mode.

13. The method claim 11, wherein the syntax element is derived implicitly at a decoder side.

14. The method claim 13, wherein the syntax element is implicitly derived according to coding mode selections, motion parameters of neighboring blocks of the current block, or motion parameters of reference blocks of the current bock.

15. The method claim 2, wherein the derived sub-block motion vector is quantized to ¼, ⅛, 1/12, 1/16 or 1/32 pixel accuracy.

16. The method claim 1, wherein the current block corresponds to a prediction unit (PU) and sub-block size corresponds to 4×4, 8×8 or 16×16.

17. An apparatus for motion information derivation for blocks of a picture, the apparatus comprising one or more electronic circuits configure to:
   receive input data associated with a current block;
   determine a current sub-block located at a current sub-block location within the current block;
   derive a Merge candidate list based on spatial and temporal neighboring blocks of the current block;
   derive a plurality of affine parameter motion vectors;
   add the plurality of affine parameter motion vectors into a predetermined position of the Merge candidate list;
   calculate a derived sub-block motion vector for the current sub-block based on a an affine motion-model function depending on the current sub-block location, wherein the motion-model function is represented by $F(x,y)=a \times x + b \times y + e$, and wherein $(x,y)$ is the current sub-block location and a, b and e are affine model parameters associated with the affine motion-model function and are determined based on the plurality of affine parameter motion vectors; and
   encode or decode the current sub-block using the derived sub-block motion vector for the current sub-block.

* * * * *